US011661281B2

(12) United States Patent
Lempiäinen et al.

(10) Patent No.: US 11,661,281 B2
(45) Date of Patent: *May 30, 2023

(54) AUTOMATED STORAGE SYSTEM

(71) Applicant: Agora Networks Oy, Espoo (FI)

(72) Inventors: Jukka Lempiäinen, Espoo (FI); Ykä Huhtala, Espoo (FI)

(73) Assignee: Agora Networks Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 17/857,060

(22) Filed: Jul. 4, 2022

(65) Prior Publication Data

US 2022/0371826 A1 Nov. 24, 2022

Related U.S. Application Data

(62) Division of application No. 17/428,993, filed as application No. PCT/FI2020/050058 on Jan. 31, 2020, now Pat. No. 11,414,272.

(30) Foreign Application Priority Data

Feb. 6, 2019 (FI) ...................................... 20195081

(51) Int. Cl.
*B65G 1/16* (2006.01)
*B65G 1/04* (2006.01)
(Continued)

(52) U.S. Cl.
CPC ............ *B65G 1/16* (2013.01); *B25J 15/0033* (2013.01); *B25J 15/0057* (2013.01);
(Continued)

(58) Field of Classification Search
CPC ...... B65G 1/16; B65G 1/0457; B65G 1/0485; B65G 1/045; B65G 1/02; B65G 47/90;
(Continued)

(56) References Cited

U.S. PATENT DOCUMENTS 4,376,502 A * 3/1983 Cohen ................... B62B 3/1464
224/547
4,896,024 A 1/1990 Morello et al.
(Continued)

FOREIGN PATENT DOCUMENTS

EP 1473254 B1 5/2008
EP 2876614 A1 5/2015
(Continued)

*Primary Examiner* — Thomas Randazzo
(74) *Attorney, Agent, or Firm* — Laine IP Oy (57) ABSTRACT

An automated storage system for receiving, storing, and dispensing items is herein proposed. The system has an enclosure, which defines a storage volume, and a port which selectively connects the storage volume to the ambient space for deposit and retrieval of items. The system also includes a plurality of containers for containing at least one item being stored as well as a support structure for supporting the plurality of containers in the storage volume. The containers feature a base, an envelope extending from the base, and an opening opposing the base and providing access to an inner volume defined by the base and envelope for containing at least one item. The system includes a manipulator for transporting the containers between an access position at the port and a storage position at the support structure. Finally, the system includes a one-sided attachment interface between the container and the support structure for removably attach the container to the support structure in the storage position, in which the opening of the container is above the base.

22 Claims, 8 Drawing Sheets

(51) Int. Cl.
  *B25J 15/00* (2006.01)
  *B25J 15/06* (2006.01)
  *B65D 25/22* (2006.01)
  *G07F 11/16* (2006.01)

(52) U.S. Cl.
  CPC ............ *B65D 25/22* (2013.01); *B65G 1/0457* (2013.01); *B65G 1/0485* (2013.01); *G07F 11/165* (2013.01); *B25J 15/06* (2013.01)

(58) Field of Classification Search
  CPC .... B25J 15/0033; B25J 15/0057; B25J 15/06; B25J 15/0052; B65D 25/22; G07F 11/165; G07F 11/70; G07F 17/0092; G07F 11/04
  See application file for complete search history.

(56) References Cited

U.S. PATENT DOCUMENTS

| | | | |
|---|---|---|---|
| 6,371,717 B1 | 4/2002 | Grams et al. | |
| 10,114,996 B2 | 10/2018 | Lossov et al. | |
| 11,414,272 B2* | 8/2022 | Lempiäinen | B65G 1/16 |
| 2006/0161296 A1 | 7/2006 | Shoenfeld | |
| 2015/0250678 A1 | 9/2015 | Eliuk | |
| 2016/0355339 A1* | 12/2016 | Peng | B65G 1/1378 |
| 2017/0137173 A1* | 5/2017 | Shamp | A47F 5/08 |
| 2020/0226539 A1* | 7/2020 | Durkee | B65G 1/1371 |

FOREIGN PATENT DOCUMENTS

| | | |
|---|---|---|
| WO | WO 0216233 A1 | 2/2002 |
| WO | WO 2018234612 A1 | 12/2018 |

\* cited by examiner

AUTOMATED STORAGE SYSTEM

FIELD

The present disclosure relates to receiving, storing, and dispensing items. In particular, the present disclosure relates to automated systems for storing articles, individually or in orderly arrangement, in warehouses or magazines.

BACKGROUND

With commerce moving ever more deeply and broadly online, the parcelled delivery of goods to the consumer has become the subject of great development. Typically, the item purchased online is delivered to the residence or place of employment of the consumer according to the order details. There are, however, problems associated with timing the receipt and delivery of the purchased item between the courier and the consumer. It is very common that the consumer is not available for receipt upon feasible delivery time or vice versa. The same problem is prevalent also in inter-consumer transactions. Several solutions have therefore been developed for storing the items in decentralized automated magazines that the items are delivered to and where item may be retrieved by the recipient at a convenient point in time. Such automated magazines are commonly provided with sophisticated user interfaces and backend systems that ensure that the person retrieving the parcel is duly notified of the availability of the parcel and that the person is entitled to access the parcel.

In addition to software development, attention has also been paid to the mechanics of storing items. The traditional unmanned parcel magazines that feature a vertical matrix of lockers for holding the items are being replaced or supplemented with much more compact units which resemble automated warehouses found in the industry. What is typical for the existing automated systems is the use of pallets which receive the item, which carry the item via a manipulator from the entry point to the system to a storage location and back, and which hand the item off to the receiver upon retrieval. Such palletized automated storage systems are disclosed by, e.g., U.S. Ser. No. 10/114,996 B2, EP 1473254 B1, and EP 2876614 A1.

There remains, however, a need to further optimize automated storage systems to make them more suitable for installation and use in public spaces.

SUMMARY

An automated storage system for receiving, storing, and dispensing items is herein proposed. The system has an enclosure, which defines a storage volume, and a port which selectively connects the storage volume to the ambient space for deposit and retrieval of items. The system also includes a plurality of containers for containing at least one item being stored as well as a support structure for supporting the plurality of containers in the storage volume. The containers feature a base, an envelope extending from the base, and an opening opposing the base and providing access to an inner volume defined by the base and envelope for containing at least one item. The system includes a manipulator for transporting the containers between an access position at the port and a storage position at the support structure. Finally, the system includes a one-sided attachment interface between the container and the support structure for removably attach the container to the support structure in the storage position, in which the opening of the container is above the base.

Additionally and according to an aspect of the present disclosure, a novel automated storage system for receiving, storing, and dispensing items is proposed. The system has an enclosure, which defines a storage volume, and a port, which selectively connects the storage volume to the ambient space for deposit and retrieval of items. The system also includes a plurality of containers for containing at least one item being stored as well as a support structure for supporting the plurality of containers in the storage volume. The containers feature a base, an envelope extending from the base, and an opening opposing the base and providing access to an inner volume defined by the base and envelope for containing at least one item. The system includes a manipulator for transporting the containers between an access position at the port and a storage position at the support structure. The manipulator is set to rotate the container between a first orientation in the access position and a second orientation in the storage position. Finally, the system includes a one-sided attachment interface between the container and the support structure for removably attach the container to the support structure in the storage position, in which the opening of the container is above the base.

Considerable benefits may be gained with the novel system. The revelation of hanging the containers from one side only in an "upright" orientation opens up the option of making better use of the vertical dimension, which is of abundance in public spaces, while minimizing the footprint of the system. Accordingly, a relatively large storage capacity may be achieved with minimizing the real estate required to install the system, which in turn enables denser population of such systems in the public space thus making a network of automated storage systems more feasible.

According to one embodiment, support structure provides random access to a plurality of storage locations thereon. The support structure may be, for example, a shelfless wall, to which the carriers may be attached through a simple attachment mechanism. This provides great freedom to the placement of the carriers such to make the best possible use of the space available by utilizing the vertical dimension better than traditional support structures featuring shelves. On the other hand, no space is wasted by the shelf mechanisms, whereby the carriers may fill the space very efficiently.

According to one embodiment, the container is rotated between an access position and storage position. By turning the carrier such that the opening faces up before moving the carrier between the port and storage location, faster speeds may be achieved without risking the item of falling off the carrier. Accordingly, user-friendliness is achieved by facilitating fast presentation of the item and turnaround time per deposit or retrieval.

BRIEF DESCRIPTION OF THE DRAWINGS

In the following certain exemplary embodiments are described in greater detail with reference to the accompanying drawings, in which.

EMBODIMENTS

Definitions

In the present context, the term "upright" includes but is not limited to vertical orientation. The term includes not only absolute vertical orientations but also slightly tilted orientations, such as up to 10 degrees from vertical.

Similarly, in the present context the term "horizontal" includes but is not limited to the absolute horizontal but should be understood to include also slightly tilted orientations, such as up to 10 degrees from the horizontal.

Figure 1:
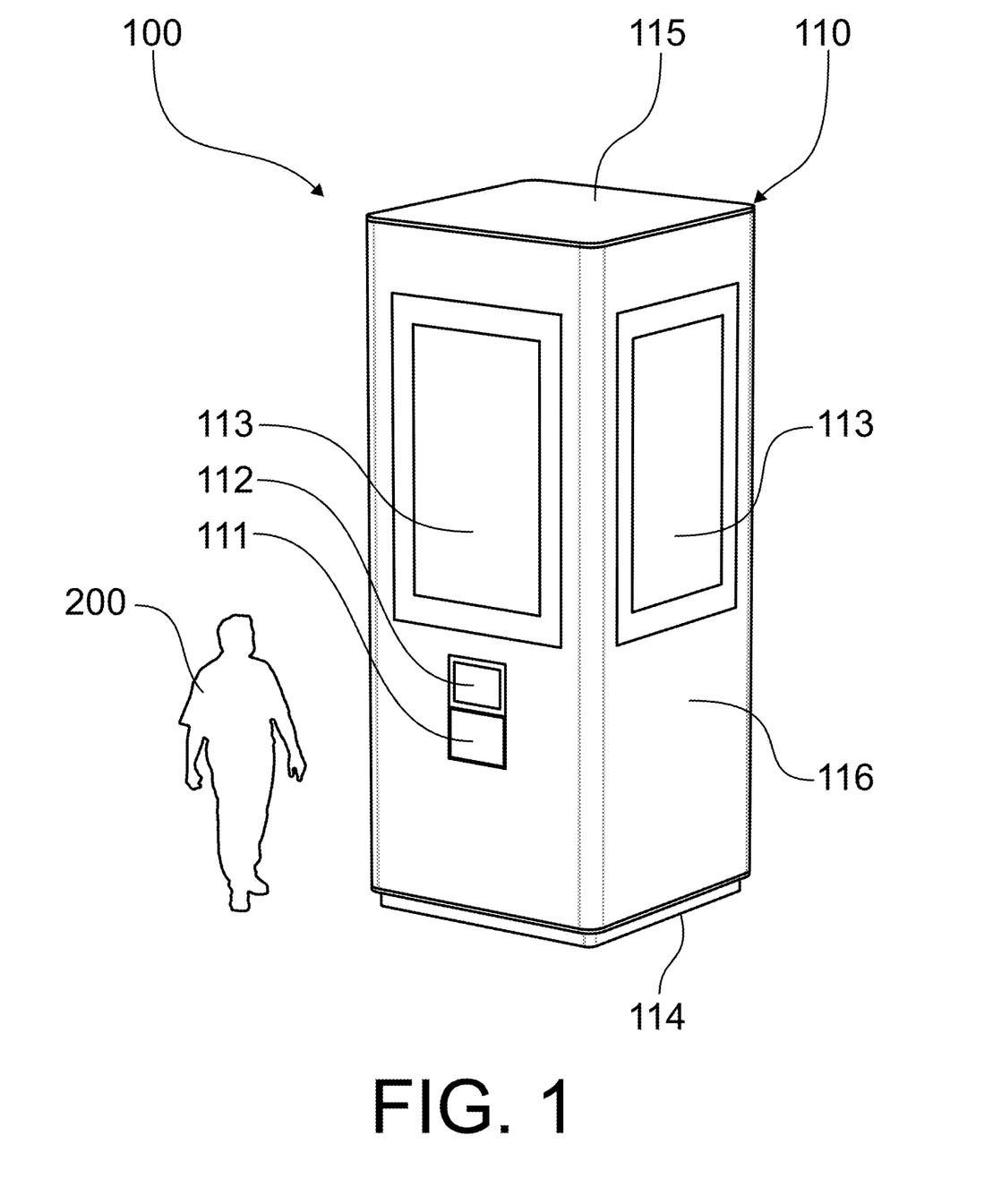
FIG. 1 illustrates a perspective view of an automated storage system featuring a generally prismatic enclosure.

FIG. 1 presents an illustration of a storage system 100 according to one embodiment. The storage system 100 is designed for receiving, storing, and dispensing items, particularly parceled items, such as post, in public spaces. The storage system 100 is intended to replace or supplement the current network of parcel storages located in the vicinity of supermarkets, kiosks, etc. It is a particular intention to replace existing advertising columns found on public squares, on the side of the road, etc., with a present storage system 100. To render such replacement compelling, the external dimension of the storage system 100 may be minimized. According to one embodiment, the external dimension of the storage system 100 is 1700×1700×4200 mm to replace an advertising column and according to another embodiment 2400×2400×4200 mm. The resulting footprint may vary between two and six square meters, particularly between 3 and 4 square meters such as three or approximately three square meters.

Figure 2:
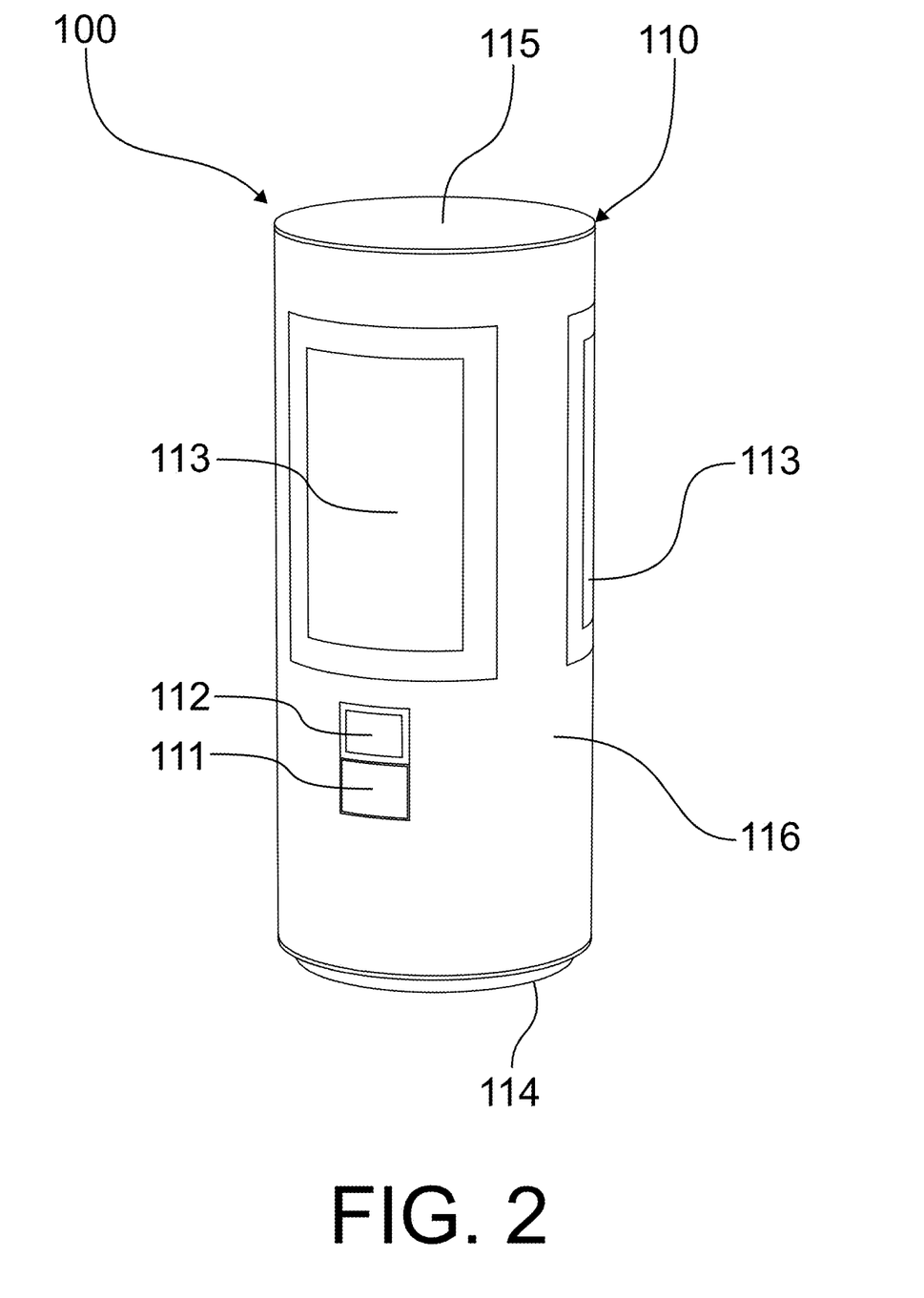
FIG. 2 illustrates a perspective view of an alternative automated storage system featuring a generally cylindrical enclosure.
Figure 3:
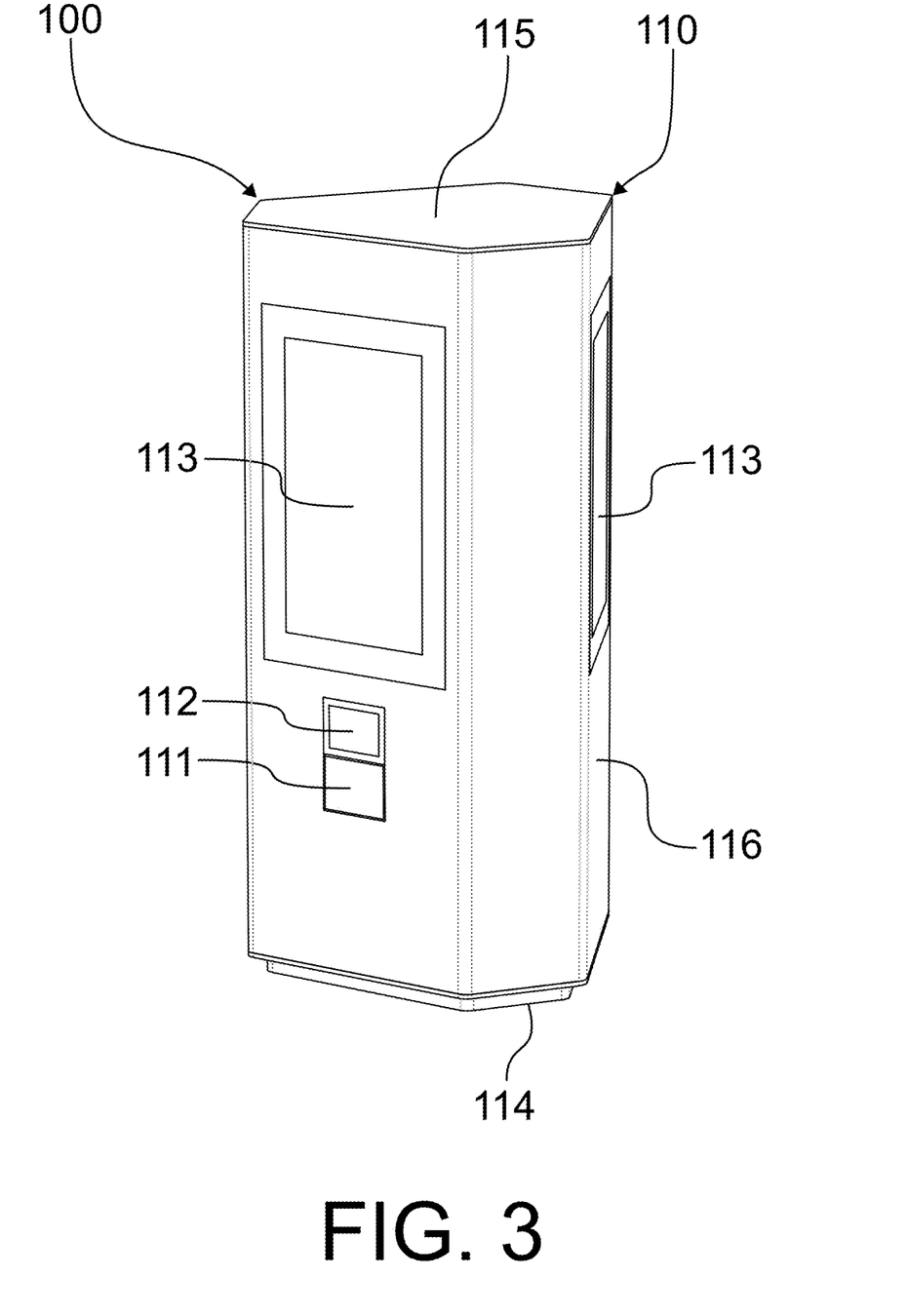
FIG. 3 illustrates a perspective view of an alternative automated storage system featuring a polyhedral enclosure with a hexagonal base.

FIG. 1 presents an example of a storage system 100 featuring a generally prismatic enclosure 110, i.e. an enclosure with a quadrilateral bottom 114 and top 115 and four quadrilateral sides forming up an envelope 116. The corners of the enclosure may be straight, rounded, chamfered, or otherwise lightened. Naturally, other shapes are also possible. FIGS. 2 and 3 illustrate alternative designs featuring a generally cylindrical and a polyhedral enclosure with a hexagonal base, respectively. Other shapes for the base are foreseeable as well, including a triangular, curved, a Reuleaux polygon, etc.

Observed from the outside, the enclosure 110 features a port 111 for receiving and dispensing items from and to the user 200. The port 111 is an opening selectively connecting the inner volume of the enclosure 110 to the ambient space. For this purpose the port 111 is equipped with an automated hatch, such as a door, e.g. sectional or folding door, or comparable repeatedly openable closing mechanism. The opening may have, for example, the dimension of 300 by 400 mm. According to an embodiment, the closing mechanism may be opened partially so as to provide several openings of different size. Additionally, the closing mechanism may close the opening from several sides, such as from above, below, from one or two sides, or any combination thereof. For example, the storage 100 may be designed to receive parcels belonging to three different size categories: small, medium, and large. The closing mechanism may selectively open to reveal a small, medium, or large opening. The benefit of a selectively revealed opening is that the user 200 may first attempt to insert an item through a small opening. If the item does not fit, the opening is enlarged to a medium or large, until the item fits. The size of the opening will then indicate the appropriate size of a container for holding the item. Alternatively, the opening of the port 111 will be standard and the depth of the container will vary to accommodate items in different size categories. If the item cannot fit in a small container, a larger one is presented to the user 200 until the item 210 fits, i.e. the closing mechanism can close. Said containers will be discussed in greater detail hereafter.

The enclosure 110 also features a user interface 112. The user interface 112 may include a display as an output device and an input device, such as a mechanical or virtual keyboard on a touchscreen. Alternatively, the output device may be a speaker and/or the input device a microphone coupled to a speech engine. Alternatively, the user interface 112 may be an electronic user interface communicating with a piece of software running on the user's 200 terminal device on or an online service accessible with the user's 200 terminal device, such as a smartphone. In the illustrated examples, the user interface 112 is a touchscreen that may be equipped with a near field communication and wireless network capabilities as well as a network connection. Accordingly, the storage system 100 may facilitate the online connection of the user's 200 terminal device which may not be equipped with a mobile data connection. The user interface 112 is set up to receive and transmit information about the item which is to be stored or dispensed. The user interface 112 may, for example, receive a security code associated with the stored item through a keyboard or by reading a code on the user's 200 terminal device or other carrier by scanning or via a wireless data connection. A correct code will trigger the system 100 to retrieve the item from the storage and present the item through the port. Conversely, the user interface may receive information regarding the deposited item, e.g. the destination of the item. The user interface 112 may also include payment capabilities, such as a credit card reader, a wireless payment interface, etc.

The enclosure 110 also features one or more displays 113 for displaying information. The display 113 may display advertisements, wayfinding information, public announcements, etc. One display may be dedicated to all or the displays may be assigned different displaying tasks; one for public information and another for commercial information.

The displays 113 may be interactive and include touch sensitive or speech controlling capabilities.

According to one embodiment, the display is integrated to the hatch of the port (not shown). The display therefore forms part of the closing mechanism. The display may be configured to slide up and down or from side to side to open and close the port.

The enclosure 110 itself may be manufactured from a metal sheet such treated to withstand the elements, such as anodized aluminium or alloy, and finished by painting for example. The enclosure 110 may be constructed of replaceable panels to improve robustness. The panels may be directly connected to each other or to a support frame inside the enclosure. One or several panels may be opened for servicing. The enclosure 110 may installed onto a footing, such as a concrete slab or on steel pillars. The enclosure 110 may be fitted with lighting, such as with a power reserve, or reflective elements to improve visibility even during blackouts.

Figure 4:
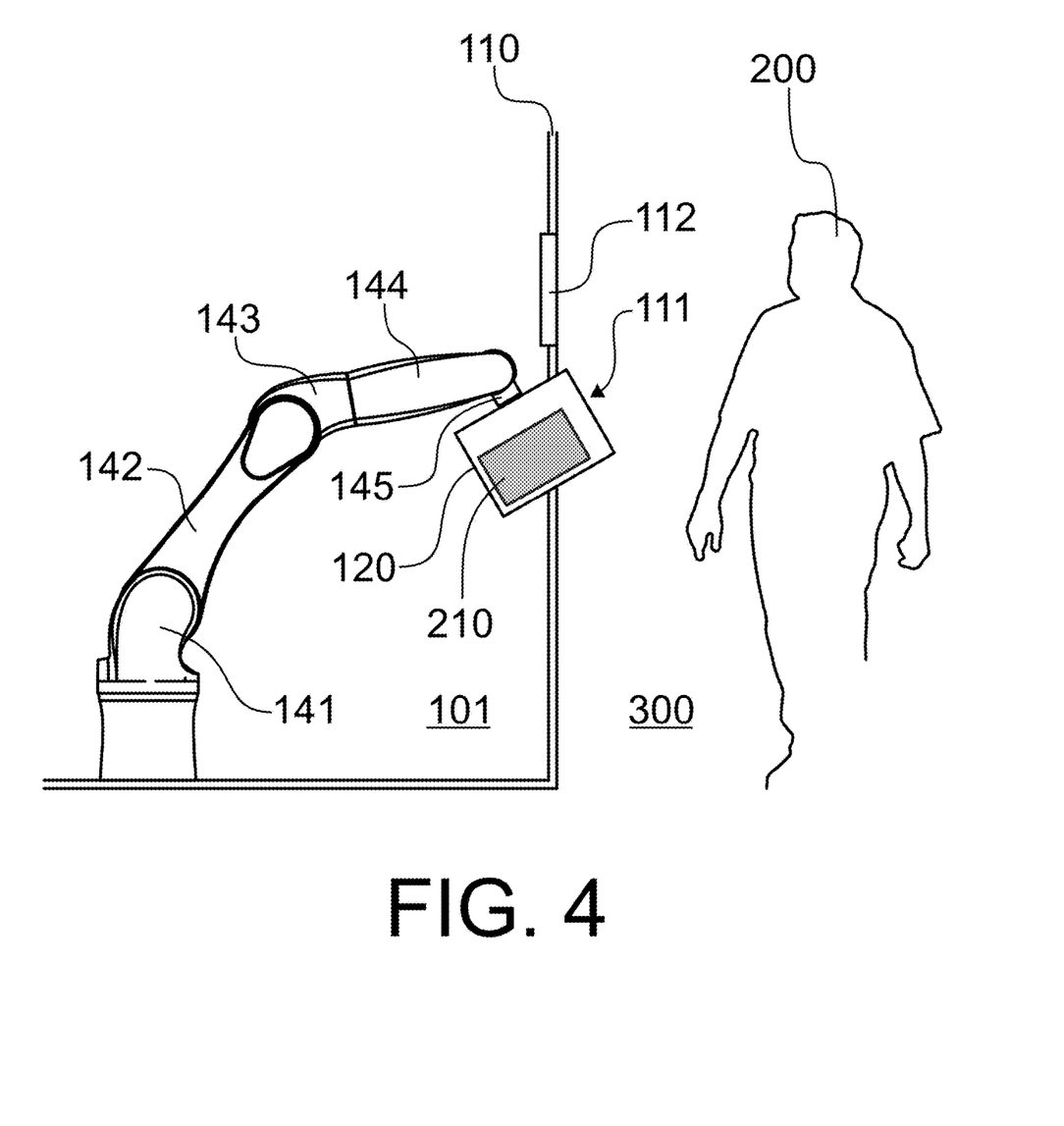
FIG. 4 illustrates a sectioned view of an automated storage system in accordance with at least some embodiments.
Figure 5:
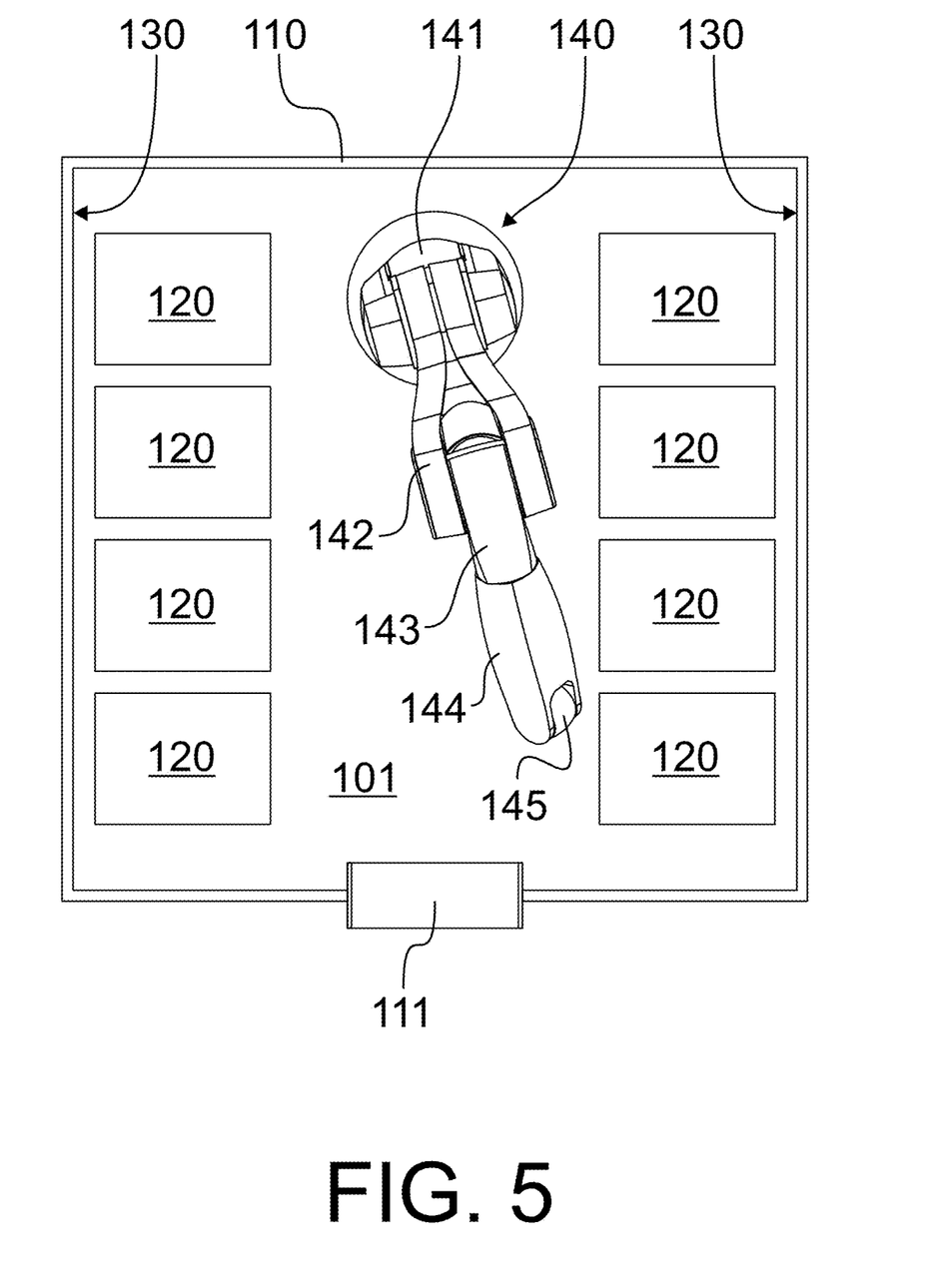
FIG. 5 illustrates a top layout of an automated storage system in accordance with at least some embodiments.

Turning now to FIGS. 4 and 5 which shows the interaction between the user 200 and the mechanism inside the enclosure 110. The system 100 includes a manipulator 140 for transporting items 210 in containers 120 between an access position at the port 111 and a storage position at the support structure 130. The manipulator 140 is designed to transport the item 210 within the inner volume 101 inside the enclosure 110. In particular, a single manipulator 140 may suffice for handling the item 210. FIG. 4 shows a parceled item 210 in the access position having been inserted into a container 120 by a user 200 through the port 111. The port 111 selectively connects the inner volume 101 of the enclosure 110 to the ambient space 300. The container 120 acts as a pallet for carrying the item 210 within the storage system 100. The container 120 features pronounced sides, i.e. an envelope, for keeping the item within the container 120 during movement between the access position and storage position. As can be seen, the container 120 may receive the item 210 through the port 111 in an angled orientation, in which the opening of the container 120 is raised slightly above the bottom of the container 120. Alternatively, the container could receive the item in a horizontal or vertical orientation (not illustrated in drawings).

The manipulator 140 may be a robot. According to an exemplary embodiment, the manipulator 140 is an industrial robot arm, such as a six axis robot arm. The illustrated embodiment features a base 141 mounted to the floor of the container 110. Alternatively, the robot could be installed "upside down" by mounting the base to the ceiling of the container (not illustrated in drawings). Alternatively, the base may be mounted to the enclosure through a conveyor, such as a linear conveyor. The conveyor may be mounted to the floor, ceiling, or wall. A modified example of FIG. 5 would feature a linear mounting conveyor at the wall opposing the port, i.e. on the back wall. The use of a conveyor extends the reach of the manipulator. Successively connected to the base 141 is an arm. In the illustrated example, the arm comprises three components, namely a primary arm 142, a secondary arm 143, and a tertiary arm 144 which is successively connected to each other through moveable joints. The joints may be simple hinge joints or rotation joints, such as that between the secondary arm 143 and tertiary arm 144, or ball and socket joints, or any combination thereof. The manipulator 140 may also have more or fewer arms or components. The free end of the manipulator 140 is equipped with a gripper 145, the details of which shall become apparent here after. Alternatively, the manipulator may be a Cartesian robot or a robotic assembly comprising linear actuators (not illustrated in the drawings).

FIG. 5 shows the action of the manipulator 140 more clearly. The manipulator 140 serves to transport the items 210 stored in containers 120 during the entire dislocation between the access position and storage position. In the example of FIG. 5, the storage system 100 contains two banks of storages arranged on opposite sides of the inner volume 101. Each bank includes a matrix or other pattern of storage locations for receiving containers. In the example of FIG. 5, the containers 120 are arranged as matrix having four columns and several rows. The number of columns and rows depends on the size of the containers. The containers 120 are stored in an upright orientation. This means that the opening of the container 120 is above the base such that the item inside the container 120 safely contained. Naturally, the orientation need not be exactly vertical to achieve the desired effect. FIG. 5 represents a top elevation view, wherein the containers 120 are empty. The manipulator 140 is configured to reach and move between each storage location and the port 111.

Figure 6A:
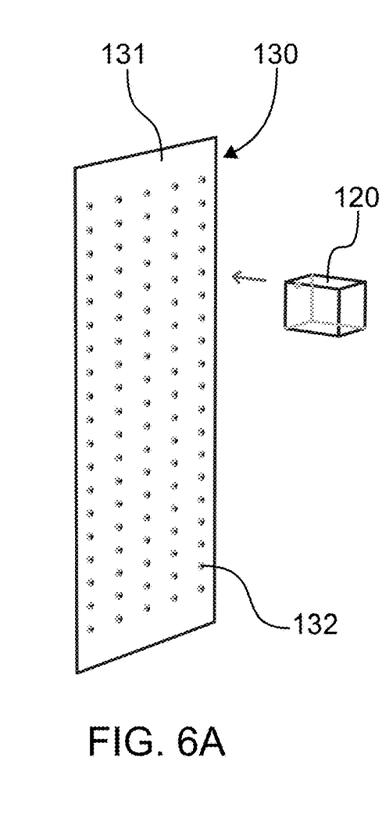
FIG. 6A illustrates a perspective view of a support structure of an automated storage system in accordance with at least some embodiments being introduced with a carrier.

The storage locations are formed on a support structure which is omitted from FIG. 5 but shown in FIGS. 6A-6D. The support structure 130 may be a vertical wall or similar load bearing element inside the enclosure 110. The support structure 130 may be a load bearing element attached to the inner surface of the enclosure 110 or the wall of the enclosure forms the support structure 130. In other words, the containers 120 may be attached to the enclosure directly or through a separate support structure. The embodiment of FIG. 6A shows an exemplary support structure 130 which is a body 131 in the form of a vertical plate attached to the inner surface of the envelope 116 of the enclosure 110 or to a support frame supporting the envelope 116. The support structure 130 includes a 19 by 5 matrix of storage locations 132, i.e. theoretical attachment points for the containers 120. The attachment points are shown schematically. The support structure 130 is such constructed as to provide random access to the storage locations 132. The support structure 130 also provides for a one-sided connection at the storage location 132 between the support structure 130 and the container 120. In other words, the storage is shelfless. The attachment interface there between shall be discussed in greater detail here after.

Figure 6B:
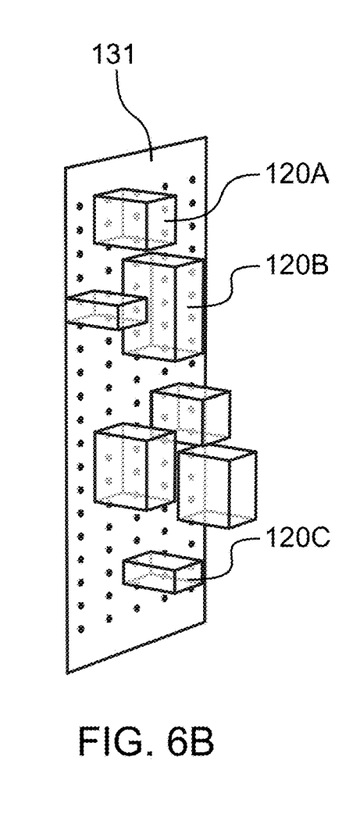
FIG. 6B illustrates a perspective view of a support structure according to FIG. 4A supporting a plurality of carriers in a first exemplary pattern.
Figure 6C:
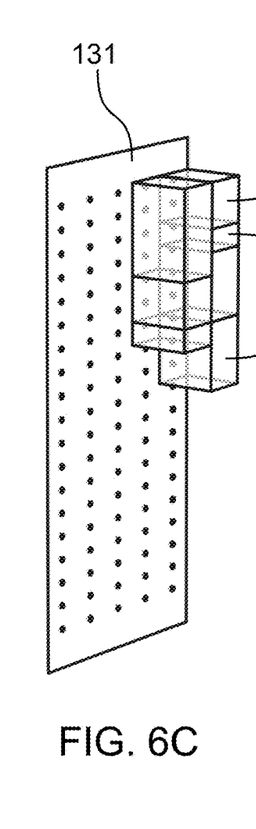
FIG. 6C illustrates a perspective view of a support structure according to FIG. 4A supporting a plurality of carriers in a second exemplary pattern.

FIG. 6B shows seven containers 120 attached to the support structure in a random pattern. The exemplary plurality of containers 120 includes two small containers 120C, two medium containers 120A, and three large containers 120B. As may be seen, the containers all share a size across two dimensions, namely the two horizontal dimensions in FIGS. 6A-6D. The dimensions may match that of the opening of the port 111, e.g. 300 by 400 mm. The height of the containers 120 therefore varies in the storage position, wherein the container 120 is in an upright orientation, i.e. the opening facing up. Accordingly, the small container 120C may have a height of 100 mm, the medium container 120A 200 mm, and the large container 120B 600 mm. Obviously, more or fewer size categories may be had or the categories may be sized differently. By having a substantially protruding envelope, the container 120 is distinguished from a mere tray with no or minimal edges that are unable to provide lateral support for the contents of the container during transportation between the access and storage positions.

The container 120 and port 111 may be designed to cooperate such that it is impossible for the user 200 to misplace a small item into the storage volume 101 past the container 120. Accordingly, the container 120 is aligned with the opening of the port 111, when the container 120 is in the access position, such as shown in FIG. 4. In particular, an imaginary plane extending past the opening 124 of the container 120 and that extending past the opening of the port 111 are parallel. In other words, the normals of those planes are aligned. Alternatively or additionally, the fit between the container 120 and the enclosure 110 or port 111 or both is configured to seal the container 120 to the enclosure 110 such that user 200 cannot misplace a small item into the storage volume 101 past the container 120. Once in the access position at the port 111 and with the closing mechanism of the port 111 open, the inner volume of the container 120 is the only space enclosed by the system 111 which is connected to the ambient space 300. Accordingly and compared with known system, the present system 111 may be constructed with a solitary closing mechanism of the port 111 without the need for presentation space which is selectively opened from the inside and outside.

Figure 6D:
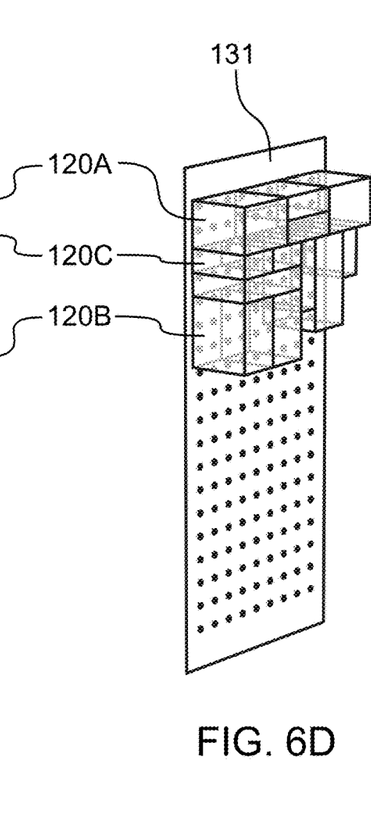
FIG. 6D illustrates a perspective view of a support structure according to FIG. 4A supporting a plurality of carriers in a third exemplary pattern.
Figure 7:
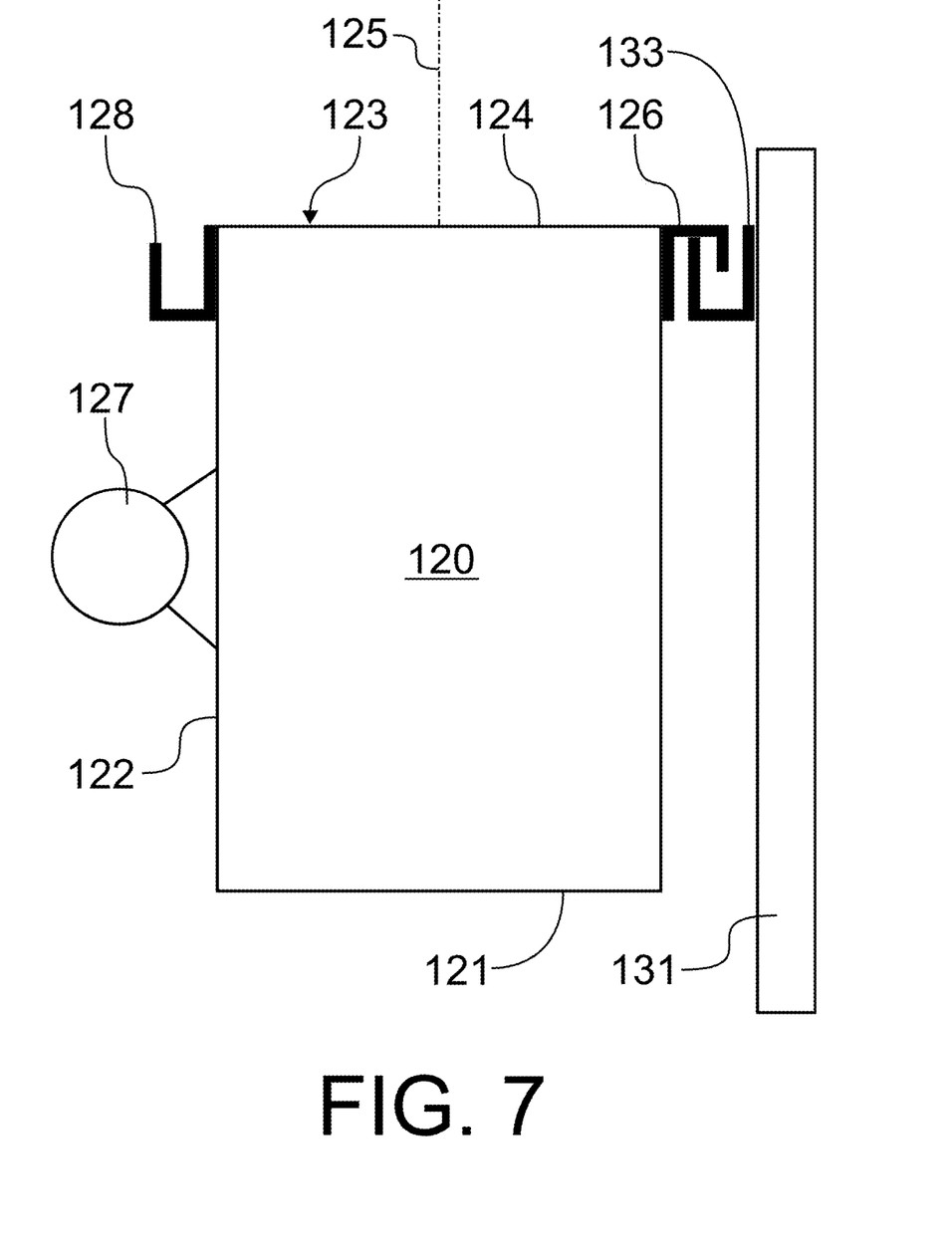
FIG. 7 illustrates a side elevation view of a connected attachment interface between the support structure and carrier and a disconnected chaining interface between carriers in accordance with at least some embodiments.

The storage positions 132 may be spaced apart and arranged such that the pitch between storage positions 132 facilitates efficient loading. Instead of a random loading pattern shown in FIG. 6B, the support structure 130 may be loaded by starting from the top right corner shown in FIG. 6C. FIG. 6D, on the other hand, shows a larger number of containers of different sizes arranged in an efficient pattern making good use of the storage area of the support structure 130. The density of the mounting points 132 defines the randomness of the positions and the size variation of the containers 120. Several different loading patterns are foreseeable. As the system 100 includes a plurality of containers 120 of different size and because the support structure 130 is not set to accommodate a fixed number of containers of a certain size, the number and size distribution of the containers 120 may be varied across time as more and more data is collected about the average occurrence of items requiring a particular container size. It may be, for example, that the number of large containers should be increased ahead of holiday seasons in the expense of small containers or that the number of small containers should be increased ahead of summer in the expense of medium containers. Thus, the combination of a plurality of different containers and random access on the support structure makes the system 100 very versatile and accommodating Let us next consider the details of the containers 120 and the cooperation between the containers 120, the manipulator 140 and the support structure 130 by studying the exemplary schematic drawings of FIGS. 7 and 8. FIG. 7 shows an exemplary shape of the container 120. The prismatic container 120 includes a base 121 and an envelope 122 extending from the base 121 so as to create sides for the container 120. While the illustrated example has a quadrilateral base and sides, also other shapes are foreseeable, such as cylindrical or even spherical. Prismatic shapes may be used for volumetric efficiency. The top of the envelope 122 has an edge 124, such as a quadrilateral edge, which defines an opening 123. The opening 123 opposes the base 121 and provides access to the inner volume defined by the base 121 and envelope 122. FIG. 7 shows the container 120 in an upright orientation, wherein the opening 123 is above the base 121. Naturally, the container may be stored in a slightly tilted orientation as long as the contents of the container 120 do not fall out. As the shape of the container 120 may vary, the orientation may be perceived by studying the normal 125 of an imaginary plane connecting the edge 124 which defines the opening 123. In the storage position, the normal 125 extends upright, generally upright or at least non-horizontal for the above-mentioned purpose.

The container may be constructed from a self-supporting material, such as aluminium or aluminium alloy, carbon fibre, or a polymer compound. Alternatively, the container 120 may be constructed from a non-self-supporting material which, when standing on its base, cannot maintain its shape. According to such an embodiment, the edge 124 or another reinforced part may be rigid enough to enable handling with a manipulator and attachment to the support structure. An example of such an embodiment would include a pouch with a reinforced opening rim.

FIG. 7 also reveals the attachment interface for attaching the container 120 to the support structure. Several different one-sided attachment interfaces are foreseen for this purpose. For example, an electromagnetic connection between a ferromagnetic element on the container and an electromagnet on the body of the support structure is foreseen. FIG. 7 illustrates an exemplary sketch of a mechanical interface, the first counterpart 126 of which provided to the container 120, namely to the envelope 122. The second counterpart 133 is provided to the body 131 of the support structure 130 thus forming a storage position (132 in FIG. 6A-6D). In a simple form, the counterparts 126, 133 of the attachment interface may be inverted hooks, wherein the hook 126 on the container 120 may be suspended by the hook 133 on the support structure 130. There may be more storage positions as there are containers, whereby the second counterparts 133 may outnumber the first counterparts 126. The interface could, alternatively, take the form of a plug-and-socket connection or any other mechanical interlocking connection that allows for repeated attachment and detachment. As the manipulator 140 may facilitate rotation in several degrees of freedom, the attachment interface may be constructed to require rotation of the container 120 to lock it into place and for releasing it.

In addition to being physically connected to the support structure 130, the container 120 may also be connected to the support structure through a wireless connection, such as an RFID data connection, so as to communicate which individual container is attached to which individual storage location. The wireless data communication device may be integrated into the attachment interface or to the envelope or base of the container.

FIG. 7 also reveals a chaining interface for chaining several containers 120 to each other. Although not shown in FIG. 7, the container 120 could support another such container attached thereto through the chaining interface. The chaining interface includes a counterpart 128 opposing the first counterpart 126 of the attachment interface and having a corresponding inverted shape. In the shown example, the counterpart 128 of the chaining interface is similar of the second counterpart 133 of the attachment interface on the support structure 130. Accordingly, the counterpart 128 of the container 120 shown in FIG. 7 may support another such container, the attachment interface first counter part of which may connect to the counterpart 128 of the chaining interface.

Figure 8:
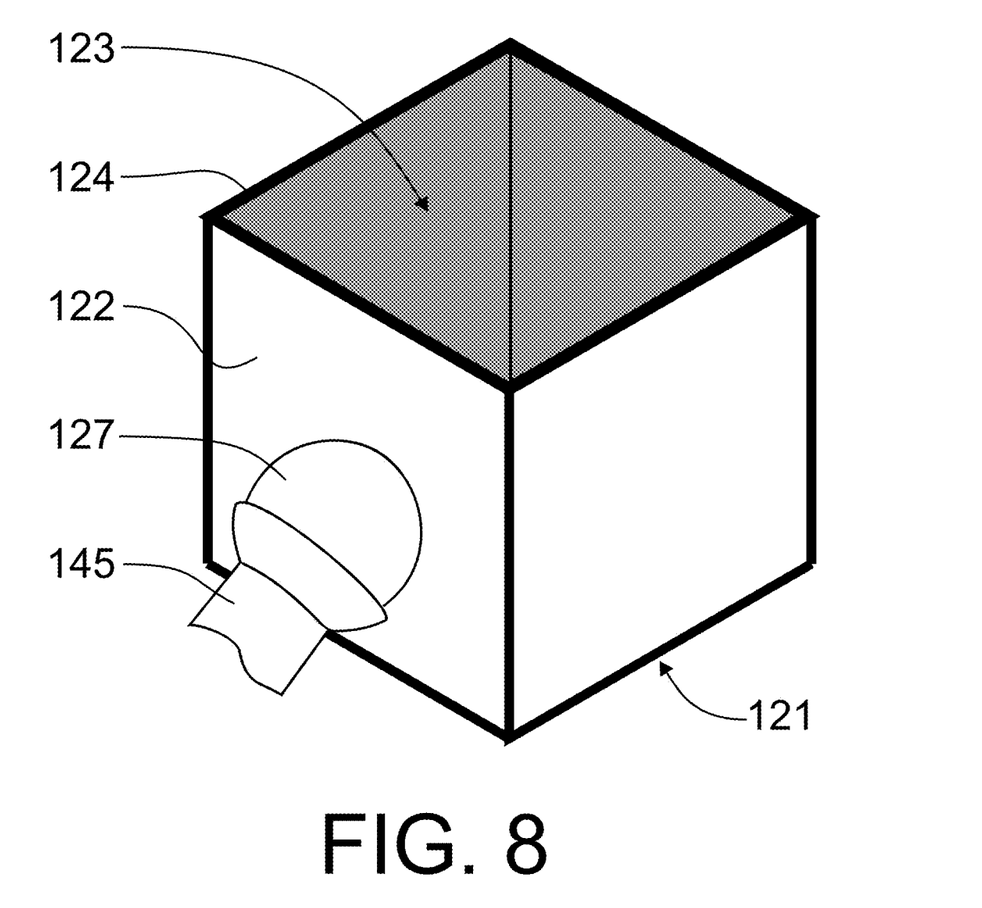
FIG. 8 illustrates a perspective view of a gripping interface between the manipulator and carrier in accordance with at least some embodiments.

FIGS. 7 and 8 show an exemplary gripping interface between the container 120 and the manipulator 140. The first counterpart 127 of the gripping interface is provided to the container 120 and the second counterpart 145 to the manipulator 140. The second counterpart 145 is in other words the gripper of the manipulator 140. The first counterpart 127 may be provided to the envelope 122 of the container 120 and located on the opposing side in respect to the first counterpart 126 of the attachment interface. That way the container 120 may engage the support structure 130 on one side and the manipulator on the opposing side. Also, by grabbing the container 120 from the side, no extra room is required around the container 120 thus facilitating a dense loading pattern on the support structure 130. The counterparts of the gripping interface are designed to be repeatedly attached and detached from each other. A skilled person may foresee several feasible gripping solutions for a one-sided engagement, such as magnetic, electromagnetic, pneumatic, or mechanical. The schematic illustration of FIGS. 7 and 8 features a pneumatic gripping interface, particularly a pneumatic ball-and-socket interface. The first counterpart 127 takes the form of a spherical piece which is engaged by a pneumatic second counterpart 145, i.e. the gripper, of the manipulator 140. Engagement between the manipulator 140 and the container 120 is achieved by first driving the gripper 145 into the vicinity of or into contact with the first counterpart 127 and then applying under pressure between the counterparts 127, 145 thus securing the container 120 to the manipulator 140. Of course, different manipulating grippers, such as moveable fingers, jaws, etc. are foreseen as alternatives.

The storage system may also be constructed as a mobile unit (not illustrated in drawings). Instead of being built on a footing, the storage may be constructed into or as the load space of a vehicle, such as a van or a truck, such as an autonomous utility vehicle. Also, to facilitate loading from such a vehicle, a stationary storage system may include a second port for exchanging containers between the stationary storage system and the mobile storage system. Alternatively, the exchange may take place via a solitary port such as that described above. The manipulator of either or both storage systems is configured to reach to the cooperating manipulator. For such an exchange, the container may include a second gripping counterpart for engaging the gripper of the manipulator of the cooperating storage system. Applied to the example of FIG. 7, the container 120 may feature a second first counterpart 127 provided on the opposing side, i.e. on the same side as the first counterpart 126 of the attachment interface. To facilitate exchange of information between the systems, a wireless data connection may be established between the respective user interfaces.

Operation of the storage system 100 is straight-forward. The user 200 or a cooperating mobile storage system either enters a retrieval code or inputs a deposit request through the user interface 112. When depositing the item 210, the user 200 selects the appropriate size of container 120 from a menu on the user interface 112 or selects the appropriate size through trial and error by fitting the item 210 into first a small container and then into larger ones, until the item 210 fits. To enter the item into the system, a container 120 is present at the port in a first orientation. In the first orientation and with the port 111 open, the inner volume of the container 120 is exposed to the ambient space 300 for entry. Once the item 210 has been put in the container 120 and the storage system 100 has the required information about the item 210, the port 111 closes and the manipulator 140 transports the container 120 from the access position at the port 111 to the storage position at the support structure 130. During the transport, the manipulator 140 rotates the container 120 between a first orientation in the access position and a second orientation in the storage position. In the illustrated example, that rotation is rotation about the horizontal axis for bringing the container 120 into a more upright orientation. Alternatively (not shown), the upright orientation is maintained during transport, which would require dropping the item into the container. As the container 120 features an envelope, very high speeds may be achieved during the transport motion without the risk of dropping the item. At the end of the transportation movement, the manipulator 140 attaches the container 120 onto the support structure 130 through the attachment interface. It is to be pointed out that the manipulator may be solely responsible for the transportation of the item 210 within the system 100.

Retrieval of the item is the reverse process. After entering the retrieval code via the user interface 112, the manipulator 140 retrieves the requested item 210 by grabbing the appropriate container 120, removing it from the support structure 130 by decoupling the attachment interface, and transports the container 120 to the port 111. During the transport motion, the container 120 may be rotated to a less upright orientation, whereby the user 200 need not excessively lift the item 210 out of the container 120. The item is presented to the user 200 in the container 120 by opening the hatch of the port 111.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

REFERENCE SIGNS LIST

| No. | Feature |
|---|---|
| 100 | storage system |
| 101 | storage volume |
| 110 | enclosure |
| 111 | port |
| 112 | user interface |
| 113 | display |
| 114 | base |
| 115 | top |
| 116 | envelope |
| 120 | container |
| 121 | base |
| 122 | envelope portion |
| 123 | opening |
| 124 | edge |
| 125 | normal |
| 126 | first counterpart of the attachment interface |
| 127 | first counterpart of the gripping interface |
| 130 | support structure |
| 131 | body |
| 132 | storage location |
| 133 | second counterpart of attachment interface |
| 140 | manipulator |
| 141 | base |
| 142 | primary arm |
| 143 | secondary arm |
| 144 | tertiary arm |
| 145 | gripper |
| 200 | user |
| 210 | item |

CITATION LIST

U.S. Ser. No. 10/114,996 B2
EP 1473254 B1
EP 2876614

The invention claimed is:

1. An automated storage system for receiving, storing, and dispensing items, the system comprising:
    an enclosure defining a storage volume and comprising a port selectively connecting the storage volume to an ambient space outside of the enclosure for deposit and retrieval of items,
    a plurality of containers, each one of which plurality of containers comprising:
        a base,
        an envelope extending from the base, and
        an opening opposing the base and providing access to an inner volume defined by the base and envelope for containing at least one item,
    a support structure for supporting the plurality of containers in the storage volume,
    a manipulator configured to transport the containers between an access position at the port and a storage position at the support structure, wherein the manipulator is configured to rotate the container between a first orientation in the access position and a second orientation in the storage position, and
    a one-sided attachment interface between the container and the support structure, which attachment interface is configured to removably attach the container to the support structure in the storage position, in which the opening of the container is above the base.

2. The automated storage system according to claim 1, wherein in the first orientation, the inner volume of the container is exposed to the ambient space.

3. The automated storage system according to claim 1, wherein the rotation is about a horizontal axis.

4. The automated storage system according to claim 1, wherein:
    the containers each exhibit a generally prismatic shape, and wherein
    the opening is provided to one side of the generally prismatic container.

5. The automated storage system according to claim 1, wherein the plurality of containers includes containers of different sizes.

6. The automated storage system according to claim 1, wherein:
    each container includes a counterpart of a chaining interface,
    the counterpart of the chaining interface is configured to engage a respective counterpart, of another such container such to attach the containers together, and wherein
    one container attached to the support structure is configured to support another container through the chaining interface.

7. The automated storage system according to claim 1, wherein the support structure is configured to provide random access to a plurality of storage locations thereon.

8. The automated storage system according to claim 1, wherein the support structure is shelfless.

9. The automated storage system according to claim 1, wherein the attachment interface is magnetic, electromagnetic, or mechanical.

10. The automated storage system according to claim 1, wherein:
    the container comprises an edge, which defines the opening, and wherein
    a normal of an imaginary plane extending across the opening is upright in the second orientation.

11. The automated storage system according to claim 10, wherein the envelope comprises said edge.

12. The automated storage system according to claim 10, wherein the normal of the imaginary plane is less upright in the first orientation than it is in the second orientation.

13. The automated storage system according to claim 1, wherein:
    the attachment interface comprises:
        a first counterpart provided to the container, and
        a second counterpart provided to the support structure, and wherein
    the counterparts of the attachment interface are configured to be repeatedly attached to and detached from each other.

14. The automated storage system according to claim 13, wherein the attachment interface comprises a plurality of such second counterparts to accommodate several containers.

15. The automated storage system according to claim 13, wherein the number of second counterparts is larger than the number of containers.

16. The automated storage system according to claim 13, wherein the counterparts of the attachment interface form an interlocking connection.

17. The automated storage system according to claim 1, wherein the manipulator comprises a robotized arm which is configured to reach between the port and the support structure.

18. The automated storage system according to claim 17, wherein the robotized arm comprises a gripper which is configured to selectively grip the container.

19. The automated storage system according to claim 18, wherein the system comprises a gripping interface between the robotized arm and the container for gripping the container with the robotized arm.

20. The automated storage system according to claim 19, wherein the gripping interface comprises:
   a first counterpart provided to the container, and
   a second counterpart provided to the arm of the manipulator,
wherein the counterparts of the gripping interface are configured to be repeatedly attached and detached from each other.

21. The automated storage system according to claim 20, wherein the gripping interface is magnetic, electromagnetic, pneumatic, or mechanical.

22. The automated storage system according to claim 20, wherein the counterparts of the gripping interface (form an interlocking connection.

\* \* \* \* \*